(12) United States Patent
Monahan et al.

(10) Patent No.: US 7,951,235 B2
(45) Date of Patent: *May 31, 2011

(54) BLACK AZO DYES AND THEIR USE IN INK JET PRINTING

(75) Inventors: Lilian Monahan, Stirlingshire (GB); Philip John Double, Manchester (GB); Roy Bradbury, St Helens (GB); Lynn Patricia Bradbury, legal representative, St Helens (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 615 days.

This patent is subject to a terminal disclaimer.

(21) Appl. No.: 11/990,086

(22) PCT Filed: Jul. 31, 2006

(86) PCT No.: PCT/GB2006/002862
§ 371 (c)(1),
(2), (4) Date: Feb. 6, 2008

(87) PCT Pub. No.: WO2007/017631
PCT Pub. Date: Feb. 15, 2007

(65) Prior Publication Data
US 2010/0215917 A1    Aug. 26, 2010

(30) Foreign Application Priority Data

Aug. 8, 2005 (GB) ................................. 0516243.3
Aug. 8, 2005 (GB) ................................. 0516244.1

(51) Int. Cl.
C09D 11/02    (2006.01)
B41J 2/01    (2006.01)

(52) U.S. Cl. ............... 106/31.5; 106/31.48; 347/100

(58) Field of Classification Search .......... 106/31.5, 106/31.48; 534/754, 755, 757, 763; 347/100; 428/195.1
See application file for complete search history.

(56) References Cited

U.S. PATENT DOCUMENTS

| | | | |
|---|---|---|---|
| 2,428,130 A | 9/1947 | Straub et al. | |
| 2,794,798 A | 6/1957 | Durig | |
| 2,897,191 A | 7/1959 | Bossard et al. | |
| 3,450,689 A | 6/1969 | Laugbein et al. | |
| 3,840,514 A * | 10/1974 | Sailer et al. | 534/754 |
| 7,041,161 B2 * | 5/2006 | Mistry et al. | 106/31.5 |
| 7,052,538 B2 * | 5/2006 | Mistry et al. | 106/31.5 |
| 7,056,376 B2 | 6/2006 | Popat et al. | |
| 7,094,279 B2 * | 8/2006 | Hanmura et al. | 106/31.5 |
| 7,465,346 B2 * | 12/2008 | Fukumoto et al. | 106/31.5 |
| 7,503,965 B2 * | 3/2009 | Matsui et al. | 106/31.5 |
| 7,637,992 B2 * | 12/2009 | Mistry | 106/31.5 |
| 7,638,609 B2 * | 12/2009 | Mistry et al. | 534/551 |
| 2009/0208713 A1 * | 8/2009 | Mistry et al. | 428/211.1 |
| 2010/0159210 A1 | 6/2010 | Monahan et al. | |

FOREIGN PATENT DOCUMENTS

| | | |
|---|---|---|
| CH | 261056 | 4/1949 |
| CH | 261057 | 4/1949 |
| FR | 1 483 639 | 6/1967 |
| GB | 572852 | 10/1945 |
| GB | 889658 | 2/1962 |
| JP | 5091627 | 7/1975 |
| JP | 5094027 | 7/1975 |
| JP | 52108115 | 9/1977 |
| WO | WO 03/095563 A1 | 11/2003 |
| WO | WO 2007/017628 | 2/2007 |
| WO | WO 2007/017632 | 2/2007 |

OTHER PUBLICATIONS

Boroda et al. Izvestiya Vysshikh Uchbenykh Zavedenii Pishchevaya Tekhnologiya 3:27-30 (1969).

* cited by examiner

*Primary Examiner* — Helene Klemanski
(74) *Attorney, Agent, or Firm* — Morgan Lewis & Bockius LLP

(57) ABSTRACT

A process is provided for printing an image on a substrate, the process comprising applying to the substrate an ink composition which comprises a liquid medium and a compound of Formula (1):

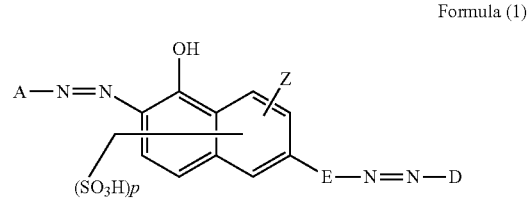

Formula (1)

wherein:
A and D each independently represent optionally substituted aryl or optionally substituted heteroaryl;
E represents optionally substituted pyrazolyl;
Z represents H, halogen, nitro, cyano, hydroxy, amino, carboxy, optionally substituted alkyl, optionally substituted alkoxy or optionally substituted aryloxy; and
p is an integer from 0 to 5;
provided that E does not have an optionally substituted carbonamide group of formula —$CONR^1R^2$ directly attached to it, wherein $R^1$ and $R^2$ each independently represent H, optionally substituted alkyl, optionally substituted cycloalkyl, or optionally substituted aryl. The printing is preferably ink jet printing. Also provided are compounds of Formula (1) and ink compositions containing the same.

11 Claims, No Drawings

BLACK AZO DYES AND THEIR USE IN INK JET PRINTING

This invention relates to compounds, to compositions and to their use in printing, particularly but not exclusively, ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example, it is desirable that they provide sharp, non-feathered images having good optical density, water-fastness, light-fastness and resistance to fading in the presence of oxidising air pollutants (e.g. ozone). The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

U.S. Pat. No. 2,428,130 (published 1947), U.S. Pat. No. 2,897,191 (published 1959) and U.S. Pat. No. 3,450,689 (published 1969) disclose azo dyes having a pyrazolyl group for use in cotton dyeing.

According to one aspect of the present invention there is provided a process for printing an image on a substrate, the process comprising applying to the substrate an ink composition which comprises a liquid medium and a compound of Formula (1):

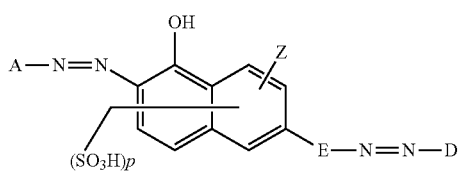

Formula (1)

wherein:
A and D each independently represent optionally substituted aryl or optionally substituted heteroaryl;
E represents optionally substituted pyrazolyl;
Z represents H, halogen, nitro, cyano, hydroxy, amino, carboxy, optionally substituted alkyl, optionally substituted alkoxy, optionally substituted aryloxy or optionally substituted sulphonamide; and
p is an integer from 0 to 5;
provided that E does not have an optionally substituted carbonamide group of formula —$CONR^1R^2$ directly attached to it, wherein $R^1$ and $R^2$ each independently represent H, optionally substituted alkyl, optionally substituted cycloalkyl, or optionally substituted aryl.

The process for printing an image on a substrate is preferably an IJP process. In other words, the process is preferably a printing process in which droplets of the ink composition are ejected through a fine nozzle onto the substrate without bringing the nozzle into contact with the substrate. Thus, preferably, the ink composition is applied to the substrate by means of an ink jet printer. The term image herein includes, without limitation, both a graphic image (including a photorealistic image) and text.

Formula (1) encompasses the compound in protonated form and salt form. For example, where a group such as sulpho is present in the Formula, the Formula encompasses it in both protonated form (i.e. —$SO_3H$) and salt form (e.g. —$SO_3Na$). For the avoidance of doubt, sulpho, carboxy, sulphonamido, phosphato and any other potentially salt forming groups, where present, may exist in the compound in either protonated or salt form.

Preferably, p is 1 or 2. Preferably, at least one sulpho group is present on the same ring of the naphthyl group as the hydroxyl group, more preferably at the 3-position (with the hydroxy group being at the position denoted as the 1-position). Where p is 2 or more (especially where p is 2), preferably at least one sulpho group is present on each ring of the naphthyl group. The sulpho groups may be present in a salt form, especially an alkali metal or ammonium ion salt form.

A and D are each independently optionally substituted aryl or optionally substituted heteroaryl groups. Preferably, A and D are each independently optionally substituted aryl. More preferably, A and D are each independently optionally substituted phenyl or naphthyl. Still more preferably, A and D are each independently optionally substituted phenyl.

Preferably, A and D are each independently substituted by up to 5 substituents. More preferably, A and D are each independently substituted by up to 4 substituents Preferably, the optional substituents on A and D are independently selected from optionally substituted alkyl, optionally substituted cycloalkyl, optionally substituted alkoxy, optionally substituted aryl, optionally substituted heteroaryl, optionally substituted aryloxy, optionally substituted amino, hydroxyl, halogen, cyano, nitro, silyl, silyloxy, optionally substituted ureido, azo, sulpho, phosphato, $COOR^1$, $OCOOR^1$, $OCOR^1$, $COR^1$, $CONR^1R^2$, $OCONR^1R^2$, $SR^1$, $SO_2NR^1R^2$, or $SO_2R^1$, wherein $R^1$ and $R^2$ are as defined above. Groups such as sulpho, phosphato and COOH (i.e. carboxy) may be present in a salt form.

Any two suitable substituents on A and/or any two suitable substituents on D may link together to form a ring, i.e. a fused ring on A and/or D. Such a fused ring may be an aliphatic or aromatic (including heteroaromatic) ring.

Preferably, E is a pyrazolyl group of Formula (2a)-(2d) and tautomers thereof:

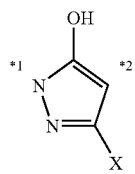

Formula (2a)

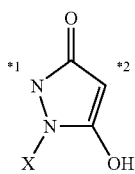

Formula (2b)

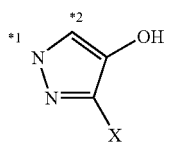

Formula (2c)

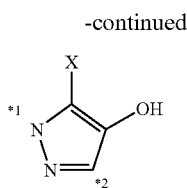

Formula (2d)

wherein:
*¹ represents the point of attachment to the naphthyl group and *² represents the point of attachment to the azo linkage; and X represents H, optionally substituted alkyl, optionally substituted cycloalkyl, optionally substituted alkoxy, optionally substituted aryl, optionally substituted heteroaryl, optionally substituted aryloxy, optionally substituted amino, halogen, cyano, hydroxyl, thio, nitro, sulpho, phosphato, optionally substituted ureido, —COOR$^1$, —OCOOR$^1$, —OCOR$^1$, —COR$^1$, —OCONR$^1$R$^2$, —SR$^1$, —SO$_2$NR$^1$R$^2$, or —SO$_2$R$^1$, wherein R$^1$ and R$^2$ are as defined above.

Preferably, X is selected from H, optionally substituted $C_{1-4}$ alkyl (preferably methyl or ethyl, more preferably methyl) or carboxy. In the case of Formula (2a), more preferably X is optionally substituted $C_{1-4}$ alkyl (especially methyl) or carboxy. In the case of Formula (2b), more preferably X is H or optionally substituted $C_{1-4}$ alkyl (especially methyl).

More preferably, E is of Formula (2a) or (2b) and most preferably E is of Formula (2a).

In other words, most preferably, the compound of Formula (1) has a Formula (1A), wherein E is a group of Formula (2a):

Formula (1A)

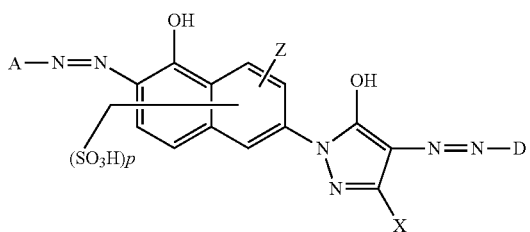

E does not carry an optionally substituted carbonamide group directly attached to it of formula CONR$^1$R$^2$. Thus, X is not CONR$^1$R$^2$.

In respect of the optional substituents on A, D and/or E (i.e. including group X on E): a preferred optionally substituted alkyl is optionally substituted $C_{1-4}$ alkyl and more preferred is $C_{1-4}$ alkyl substituted with at least one of sulpho, carboxy, phosphato, $C_{1-4}$ alkoxy, amino and hydroxy; a preferred optionally substituted alkoxy is optionally substituted $C_{1-4}$ alkoxy and more preferred is $C_{1-4}$ alkoxy substituted with at least one of sulpho, carboxy, phosphato, $C_{1-4}$ alkoxy, amino and hydroxy; a preferred optionally substituted aryl is optionally substituted phenyl or naphthyl (especially phenyl) and more preferred is phenyl or naphthyl (especially phenyl) substituted with at least one of sulpho, carboxy, phosphato, $C_{1-4}$ alkoxy, amino and hydroxy; a preferred optionally substituted heteroaryl is optionally substituted pyridyl, pyridone, pyrazolyl or 1,2,4-triazole; a preferred optionally substituted amino is amino carrying one or two optionally substituted aryl groups, one or two optionally substituted $C_{1-4}$ alkyl groups or an acyl group; and a preferred azo group is optionally substituted carbocyclic azo or optionally substituted heterocyclic azo, alkenyl azo, and more preferred among these is optionally substituted aryl azo or optionally substituted heteroaryl azo, wherein preferred optional substituents for these azo groups are selected from optionally substituted alkyl, optionally substituted cycloalkyl, optionally substituted alkoxy, optionally substituted aryl, optionally substituted heteroaryl, optionally substituted aryloxy, optionally substituted amino, hydroxyl, halogen, cyano, nitro, optionally substituted ureido, optionally substituted carbocyclic azo or optionally substituted heterocyclic azo, sulpho, phosphato, COOR$^1$, OCOOR$^1$, OCOR$^1$, COR$^1$, CONR$^1$R$^2$, OCONR$^1$R$^2$, SR$^1$, SO$_2$NR$^1$R$^2$, or SO$_2$R$^1$ and more preferred is that the azo group is substituted by at least one sulpho, carboxy or phosphato group.

Preferred substituents for D are selected from sulpho, carboxy, phosphato, hydroxyl, nitro, optionally substituted $C_{1-4}$ alkyl, optionally substituted $C_{1-4}$ alkoxy, azo (especially optionally substituted aryl azo or heteroaryl azo, more especially aryl or heteroaryl azo substituted with sulpho, carboxy, and/or phosphato), halogen and cyano. More preferred substituents for D are selected from sulpho, carboxy, optionally substituted $C_{1-4}$ alkoxy and optionally substituted aryl azo (especially aryl azo substituted with sulpho and/or carboxy and more especially phenyl azo substituted with sulpho and/or carboxy).

A is preferably substituted by 1 to 4, more preferably 2 to 4, still more preferably 2 to 3, and most preferably 3, substituents.

Preferably, A is at least substituted by one or more, more preferably one or two, still more preferably two, groups selected from $C_{1-4}$ alkoxy and —O—(CH$_2$)$_{1-4}$—OH, most preferably —O—(CH$_2$)$_{1-4}$—OH. The —O—(CH$_2$)$_{1-4}$—OH is preferably —O—C$_2$H$_4$—OH. Especially preferably, A is at least substituted by two —O—C$_2$H$_4$—OH groups.

Preferably, A is at least substituted by at least one optionally substituted carbocyclic azo or optionally substituted heterocyclic azo, more preferably at least one optionally substituted aryl azo or optionally substituted heteroaryl azo and most preferably at least one optionally substituted aryl azo. Preferred optionally substituted aryl azo is optionally substituted phenyl or naphthyl azo (especially phenyl azo). Preferred optionally substituted heteroaryl azo is optionally substituted pyridyl, pyridone, pyrazolyl or 1,2,4-triazole azo (especially pyrazolyl azo). Preferred optional substituents for the azo group are selected from optionally substituted alkyl, optionally substituted cycloalkyl, optionally substituted alkoxy, optionally substituted aryl, optionally substituted heteroaryl, optionally substituted aryloxy, optionally substituted amino, hydroxyl, halogen, cyano, nitro, optionally substituted ureido, optionally substituted carbocyclic azo or optionally substituted heterocyclic azo, sulpho, phosphato, COOR$^1$, OCOOR$^1$, OCOR$^1$, COR$^1$, CONR$^1$R$^2$, OCONR$^1$R$^2$, SR$^1$, SO$_2$NR$^1$R$^2$, or SO$_2$R$^1$. In a more preferred embodiment, the azo group is substituted by at least one sulpho, carboxy or phosphato group. Where A is substituted by at least one optionally substituted carbocyclic azo or optionally substituted heterocyclic azo, the A group is attached to a nitrogen atom of the said azo group.

More preferably, A is substituted by at least one, more preferably two, of the groups selected from $C_{1-4}$ alkoxy and —O—$(CH_2)_{1-4}$—OH as described above and by at least one of the optionally substituted carbocyclic azo or optionally substituted heterocyclic azo groups as described above. Accordingly, especially preferably, A is substituted by two substituents selected from $C_{1-4}$ alkoxy and —O—$(CH_2)_{1-4}$—OH (especially A is substituted by two —O—$C_2H_4$—OH groups) and by an optionally substituted carbocyclic azo or optionally substituted heterocyclic azo (especially an optionally substituted aryl azo, more especially an optionally substituted phenyl azo).

Thus, in a most especially preferred embodiment, A is of Formula (2e):

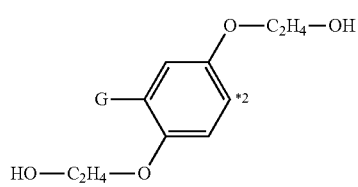

Formula (2e)

wherein *² represents the point of attachment to the azo linkage and G represents optionally substituted aryl azo as herein defined.

Preferably the compound of Formula (1) has at least two water solubilising groups. Preferably, at least one water solubilising group is present on A and/or D.

The water solubilising groups may be any groups able to increase the aqueous solubility of the compound of Formula (1). Thus, for example, it may be an ionisable anionic or cationic group or a non-ionic group.

Preferably, the water solubilising groups comprise an anionic ionisable group. More preferably the water solubilising groups comprises a group selected from the group consisting of carboxy, sulpho and phosphato. Preferably at least two, more preferably all, of the water solubilising groups are selected from carboxy, sulpho and phosphato. Further preferably the water solubilising groups include at least one sulpho group. Especially preferably the compound of Formula (1) has at least two sulpho groups, more preferably two or three sulpho groups.

Preferably the compound of Formula (1) has a solubility in water at 25° C. of at least 1% and more preferably the compound of Formula (1) has a solubility in water at 25° C. of at least 2.5%. It is particularly preferred that the compound of Formula (1) has a solubility in water at 25° C. of at least 5%.

In one type of embodiment, Z is not hydroxy.
In another type of embodiment, Z is not amino.
In yet another type of embodiment, Z is not hydroxy or amino.

Preferably, Z is H or halogen (especially chlorine). Most preferably Z is H.

Preferably, the compound of Formula (1) is not a compound wherein D has a Formula (3a) or (3b):

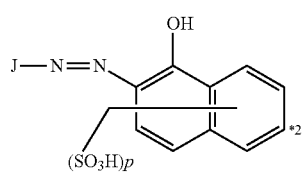

Formula (3a)

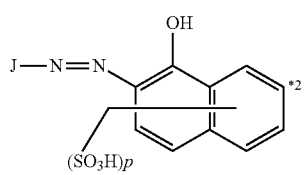

Formula (3b)

wherein *² represents the point of attachment to the azo linkage and J represents optionally substituted aryl. J is preferably aryl substituted with an optionally substituted aryl azo group.

In view of the foregoing preferences, in a particularly preferred embodiment of the present invention, the compound is of Formula (1) wherein:

p is 1 or 2 (preferably 1);
Z is H;
A is optionally substituted phenyl (i) carrying two groups selected from $C_{1-4}$ alkoxy and —O—$(CH_2)_{1-4}$—OH, more preferably —O—$(CH_2)_{1-4}$—OH, most preferably —O—$C_2H_4$—OH and (ii) carrying an optionally substituted phenyl azo group carrying at least one water solubilising group preferably selected from sulpho, carboxy and/or phosphato group, preferably at least one sulpho and/or carboxy group, more preferably at least one sulpho group;
E is of Formula (2a) as hereinbefore defined wherein X is selected from optionally substituted $C_{1-4}$ alkyl (preferably methyl) or carboxy, especially carboxy; and
D is optionally substituted phenyl carrying at least one water solubilising group preferably selected from sulpho, carboxy and/or phosphato group, preferably at least one sulpho and/or carboxy group, more preferably at least one sulpho group.

Thus, in a more preferred embodiment of the present invention in accordance with the above, the compound is of Formula (1) wherein:

p is 1;
Z is H;
A is optionally substituted phenyl carrying two —O—$C_2H_4$—OH groups and an optionally substituted phenyl azo group carrying at least one water solubilising group, preferably at least one sulpho group;
E is of Formula (2a) as hereinbefore defined wherein X is methyl or carboxy; and
D is optionally substituted phenyl carrying at least one water solubilising group, preferably at least one sulpho group.

In an even more preferred embodiment of the present invention, the compound is of Formula (1B):

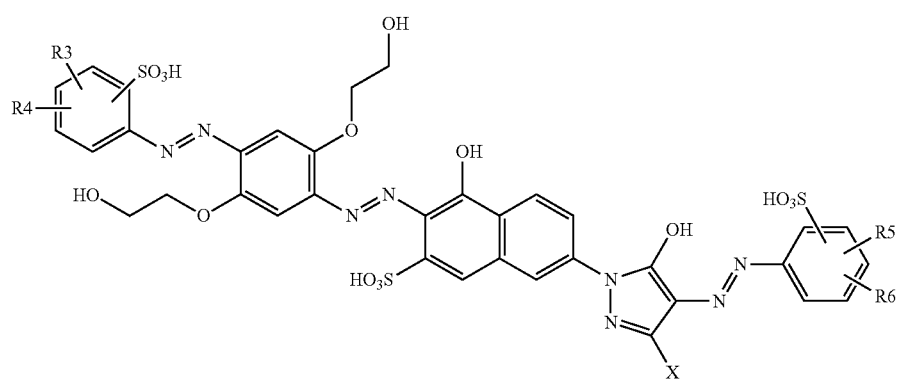

Formula (1B)

wherein X is methyl or carboxy and $R^3$, $R^4$, $R^5$ and $R^6$ each independently represent H, optionally substituted alkyl (especially $C_{1-4}$ alkyl substituted with at least one of sulpho, carboxy, phosphato, $C_{1-4}$ alkoxy, amino and hydroxy), optionally substituted cycloalkyl, optionally substituted alkoxy (especially $C_{1-4}$ alkoxy substituted with at least one of sulpho, carboxy, phosphato, $C_{1-4}$ alkoxy, amino and hydroxy), optionally substituted aryl (especially phenyl substituted with at least one of sulpho, carboxy, phosphato, $C_{1-4}$ alkoxy, amino and hydroxy), optionally substituted heteroaryl, optionally substituted aryloxy, optionally substituted amino (especially amino carrying one or two optionally substituted aryl groups, one or two optionally substituted $C_{1-4}$ alkyl groups or an acyl group), hydroxyl, halogen, cyano, nitro, optionally substituted ureido, azo (especially optionally substituted phenyl azo), sulpho, phosphato, $COOR^1$, $OCOOR^1$, $OCOR^1$, $COR^1$, $CONR^1R^2$, $OCONR^1R^2$, $SR^1$, $SO_2NR^1R^2$, or $SO_2R^1$.

An example of a preferred compound of Formula (1B) is a compound of Formula (1C):

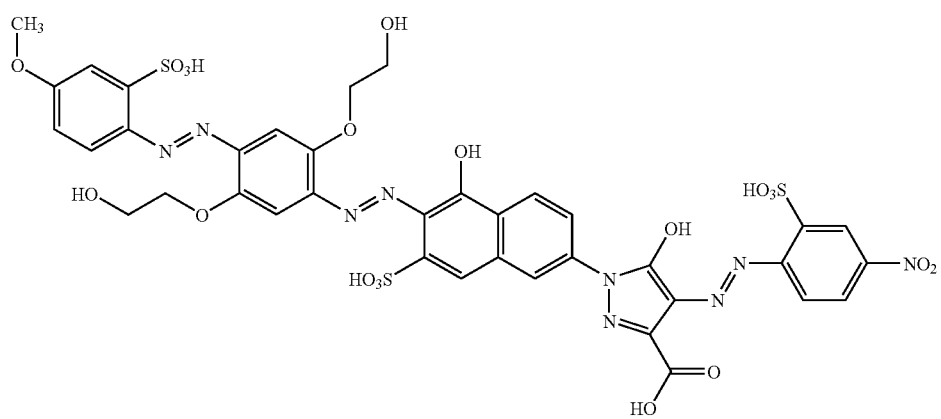

Formula (1C)

Another example of a preferred compound of Formula (1B) is a compound of Formula (1D):

Formula (1D)

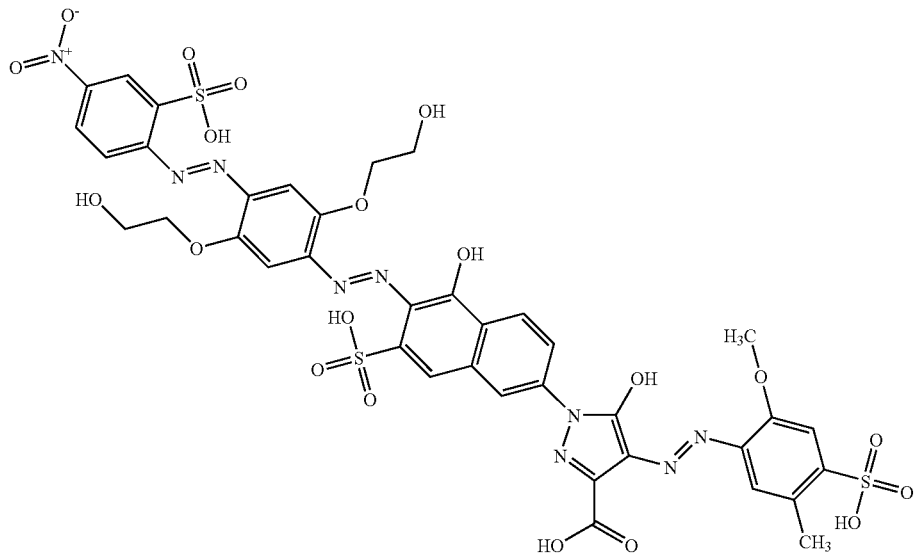

In this specification, where any substituent is itself defined as being optionally substituted it may be substituted by one or more of any of the substituents described herein.

In this specification, unless the context indicates otherwise, preferred aryl groups are phenyl and naphthyl and preferred heteroaryl groups are pyridyl, pyrazolyl and 1,2,4-triazole.

The term 'alkyl' as used herein includes moieties having a different degree of saturation and/or valence, e.g. moieties that comprise double bonds or triple bonds, such as alkenyl or alkynyl. In this specification, unless the context indicates otherwise, preferred alkyl groups are $C_{1-4}$ alkyl.

The term 'halogen' or 'halo' as used herein signifies fluoro, chloro, bromo and iodo. In this specification, unless the context indicates otherwise, preferred halogen groups are fluoro, chloro and bromo.

Unless the context clearly indicates otherwise, a group herein which comprises a chain of three or more atoms signifies a group in which the chain wholly or in part may be linear, branched and/or form a ring (including spiro and/or fused rings).

The compounds of Formula (1) may be prepared by diazotising a compound of the formula A—NH$_2$ (wherein A is defined as above) to give a diazonium salt and coupling the resultant diazonium salt with a compound of Formula (4):

Formula (4)

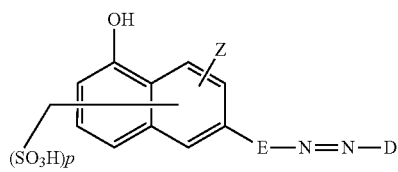

The diazotisation is preferably performed at a temperature of 5° C. or below, more preferably at a temperature in the range −10° C. to 5° C., more preferably at a temperature in the range 0° C. to 5° C.

The compound of Formula (4) may be prepared by diazotising a compound of the formula H$_2$N-D (wherein D is defined as above) to give a diazonium salt and coupling the resultant diazonium salt with a compound of the Formula (5):

Formula (5)

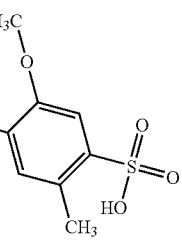

The compound of Formula (5) may be prepared by diazotising a compound of Formula (6):

Formula (6)

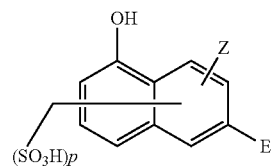

to give a diazonium salt, reducing the diazonium salt to the corresponding hydrazine compound and subsequently reacting it with an appropriately substituted β-keto ester to form the pyrazolyl group E of the compound of Formula (5).

The compound of Formula (1) may be provided in a salt form. Preferred salts are alkali metal salts, especially lithium, sodium and potassium salts, ammonium and substituted ammonium salts. Especially preferred salts are salts with ammonia and volatile amines, lithium and sodium. The compounds may be converted into a salt using known techniques.

The compound of formula (1) may exist in tautomeric forms (tautomers) other than those shown in this specification and, accordingly, Formula (1) includes all possible tautomeric forms of the compound. Thus, all other tautomeric forms are included within the scope of the present invention and the claims of this specification.

Preferably the compound of Formula (1) is black. More preferably, the compound of Formula (1) is a black dye.

According to a further aspect of the present invention there is provided an ink composition comprising:
(a) from 0.01 to 30 parts of a compound of the Formula (1); and
(b) from 70 to 99.99 parts of a liquid medium or a low melting point solid medium;
wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the compound precipitating if evaporation of the liquid medium occurs during storage.

Preferred liquid media include water, a mixture of water and an organic solvent and an organic solvent free from water. Most preferably, the liquid medium is a mixture of water and an organic solvent When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

A preferred liquid medium comprises:
(a) from 75 to 95 parts water; and
(b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;
wherein the parts are by weight and the sum of the parts (a) and (b)=100.

Another preferred liquid medium comprises:
(a) from 60 to 80 parts water;
(b) from 2 to 20 parts diethylene glycol; and
(c) from 0.5 to 20 parts in total of one or more solvents selected from 2-pyrrolidone, N-methylpyrrolidone, cyclohexanol, caprolactone, caprolactam, pentane-1,5-diol and thiodiglycol;
wherein the parts are by weight and the sum of the parts (a), (b) and (c)=100.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink composition.

Liquid media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The compound of Formula (1) may be dissolved in the low melting point solid or may be finely dispersed in it.

The ink composition may also contain additional components known for use in ink jet printing inks, for example viscosity and surface tension modifiers, corrosion inhibitors, biocides, kogation reducing additives and surfactants which may be ionic or non-ionic.

Typically the liquid medium will further comprise one or more surfactants, for example anionic and/or nonionic surfactants. Examples of anionic surfactants include: sulphonate surfactants such as sulphosuccinates (Aerosol™ OT, A196; AY and GP, available from CYTEC) and sulphonates (Aerosol™ DPOS-45, OS available from CYTEC; Witconate™ C-50H available from WITCO; Dowfax™ 8390 available from DOW); and fluoro surfactants (Fluorad™ FC99C available from 3M). Examples of nonionic surfactants include: fluoro surfactants (Fluorad™ FC170C available from 3M); alkoxylate surfactants (Tergitol™ series 15S-5, 15S-7, and 15S-9 available from Union Carbide); and organosilicone surfactants (Silwet™ L-77 and L-76-9 available from WITCO). The Surfynol™ range of surfactants (available from Air Products) may also be suitable.

In one embodiment inks according to the invention have a pH of from about 3 to about 5, preferably from about 3.5 to about 4.5. In another embodiment the pH of the composition is preferably from 4 to 11, more preferably from 7 to 10. Optionally the ink composition comprises a buffer.

One or more buffers may optionally be included in the liquid medium to modulate pH of the ink. The buffers can be organic-based biological buffers or inorganic buffers, preferably, organic-based. Examples of preferred buffers include tris(hydroxymethyl)aminomethane (TRIS), available from companies such as Aldrich Chemical (Milwaukee, Wis.), 4-morpholine ethanesulphonic acid (MES), 4-morpholinepropanesulphonic acid (MOPS), and beta-hydroxy-4-morpholinepropanesulphonic acid (MOPSO). Further, the buffers employed preferably provide a pH ranging from 3 to 10 in the practice of the invention.

One or more of the biocides commonly employed in ink jet inks may optionally be used in the ink, such as Nuosept™ 95, available from Huls America (Piscataway, N.J.); Proxel™ GXL, available from Arch Chemicals, Inc. (Norwalk, Conn.); and glutaraldehyde, available from Union Carbide Company (Bound Brook, N.J.) under the trade designation Ucarcide 250.

Inks according to the invention may optionally also include one or more metal chelators. Such chelators are used to bind any free transition metal cations that may be present in the ink. Examples of preferred metal chelators include: ethylenediaminetetraacetic acid ("EDTA"), diethylenediaminepentaacetic acid ("DPTA"), trans-1,2-diaminocyclohexanetetraacetic acid ("CDTA"), ethylenedinitrilotetraacetic acid ("EGTA"). Other chelators may be employed additionally or alternatively.

The viscosity of the ink at 25° C. is preferably less than 50 cP, more preferably less than 20 cP and especially less than 5 cP.

Ink compositions of the present invention suitable for use in an ink-jet printer preferably contain less than 500 ppm, more preferably less than 250 ppm, especially less than 100 ppm, more especially less than 10 ppm in total of divalent and trivalent metal ions (other than any divalent and trivalent metal ions bound to a compound of Formula (1) or any other component of the ink).

Preferably, ink compositions of the present invention suitable for use in an ink-jet printer have been filtered through a filter having a mean pore size below 10 μm, more preferably below 3 μm, especially below 2 μm, more especially below 1 μm. This filtration removes particulate matter that could otherwise block the fine nozzles found in many ink-jet printers.

When the ink according to the invention is used in ink jet printing, the ink preferably has a concentration of less than 500 parts per million, more preferably less than 100 parts per million of halide ions.

The compound of Formula (1) may be used as the sole colorant in the ink composition because of its attractive black shade. However, if desired, one may combine the compound of Formula (1) together with one or more further colorants to reduce nozzle blockage (by improving their solubility) or if a slightly different shade is required for a particular end use. Thus, inks according to the present invention may be obtained which comprise at least one further colorant. The further colorants are preferably dyes. When further colorants are included in the composition these are preferably selected from black, magenta, cyan, yellow, red, green, blue and orange colorants and combinations thereof. Suitable black, magenta, cyan, yellow, red, green, blue and orange colorants for this purpose are known in the art. Some examples are given below.

Suitable further black colorants include C.I.Food Black 2, C.I.Direct Black 19, C.I.Reactive Black 31, PRO-JET™ Fast Black 2, C.I.Direct Black 195; C.I.Direct Black 168; other black colorants made or sold by original equipment manufacturers (OEMs) including Lexmark, Seiko Epson, Canon and Hewlett-Packard or by colorant manufacturers including Fuji Photo Film Co., Nippon Kayaku and Mitsubishi and other black colorants described in patents and patent applications by OEMs including the aforesaid Lexmark (e.g. EP 0 539,178 A2, Example 1, 2, 3, 4 and 5), Orient Chemicals (e.g. EP 0 347 803 A2, pages 5-6, azo dyes 3, 4, 5, 6, 7, 8, 12, 13, 14, 15 and 16), Canon, Hewlett-Packard and Seiko Epson Corporation or by colorant manufacturers including Fuji Photo Film Co., Nippon Kayaku and Mitsubishi.

Suitable further magenta colorants include PRO-JET™ Fast Magenta 2 and other magenta colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

Suitable further yellow colorants include C.I.Direct Yellow 142; C.I.Direct Yellow 132; C.I.Direct Yellow 86; PRO-JET™ Yellow OAM; PRO-JET™ Fast Yellow 2; C.I.Direct Yellow 85; C.I. Direct Yellow 173; and C.I.Acid Yellow 23 and other yellow colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

Suitable further cyan colorants include phthalocyanine, colorants, C.I. Direct Blue 199 and C.I. Acid Blue 9 and other cyan colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

The ink composition used in the process for printing an image is preferably an ink composition as defined in the above aspect of the present invention.

The ink composition is preferably applied to the substrate using an ink jet printer. In that case, the ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are papers which have an acid, alkaline or neutral character. Examples of commercially available papers include HP Premium Coated Paper™, HP Photopaper™, HP Printing Paper™ (available from Hewlett Packard Inc.); Stylus Pro 720 dpi Coated Paper™, Epson Photo Quality Glossy Film™, Epson Photo Quality Glossy Paper™ (all available from Seiko Epson Corp.); Canon HR 101 High Resolution Paper™, Canon GP 201 Glossy Paper™, Canon HG 101 and HG201 High Gloss Film™, Canon PR101™ (all available from Canon); Kodak Premium Photopaper, Kodak Premium InkJetpaper™ (available from Kodak); Konica Inkjet Paper QP™ Professional Photo Glossy, Konica Inkjet Paper QP™ Professional Photo 2-sided Glossy, Konica Inkjet Paper QP™ Premium Photo Glossy, Konica Inkjet Paper QP™ Premium Photo Silky™ (available from Konica) and Xerox Acid Paper (this is a plain paper) (available from Xerox).

The compounds of Formula (1) and ink compositions of the present invention provide prints of attractive, neutral black shades that are particularly well suited for the ink jet printing of images (including text). The ink compositions have good storage stability and low tendency to block the very fine nozzles used in ink jet printers. Furthermore, the resultant images have good optical density, light-fastness, wet-fastness and resistance to fading in the presence of oxidising air pollutants (e.g. ozone), particularly light fastness.

According to a still further aspect of the present invention there is provided a substrate on which an image has been printed by the process of the present invention as hereinbefore defined. Preferably, the substrate comprises a paper, an overhead projector slide or a textile material.

When the substrate is a textile material the process for printing an image preferably comprises:
i) applying the ink composition to the textile material using an ink jet printer; and
ii) heating the resultant printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in European Patent Application No. 534660A1.

According to a yet still further aspect of the present invention there is provided an ink jet printer cartridge, optionally refillable, comprising one or more chambers and an ink composition, wherein the ink composition is present in at least one of the chambers and the ink composition is an ink composition according to the present invention as herein defined.

According to another aspect of the present invention there is provided an ink set comprising at least a black ink, a magenta ink, a cyan ink and a yellow ink and wherein the black ink comprises a compound of Formula (1) as hereinbefore defined and/or an ink composition as hereinbefore defined.

According to still another aspect of the present invention there is provided use of a compound of Formula (1) as hereinbefore defined to provide a printed image having good optical density, light fastness, wet fastness or resistance to fading in the presence of oxidising gases.

According to yet still another aspect of the present invention there is provided a compound of Formula (1) or a salt thereof as hereinbefore, wherein A carries at least one optionally substituted carbocyclic azo or optionally substituted heterocyclic azo group as hereinbefore defined.

In this specification, unless the context clearly indicates otherwise, as used herein plural forms of the terms herein are to be construed as including the singular form and vice versa.

Throughout the description and claims of this specification, unless the context clearly indicates otherwise, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention is now further illustrated by the following Examples in which all parts and percentages are by weight unless otherwise stated. The Examples are only illustrative of the invention and are not limiting on the scope of the invention.

EXAMPLE 1

Preparation of a Dye Compound of structure:

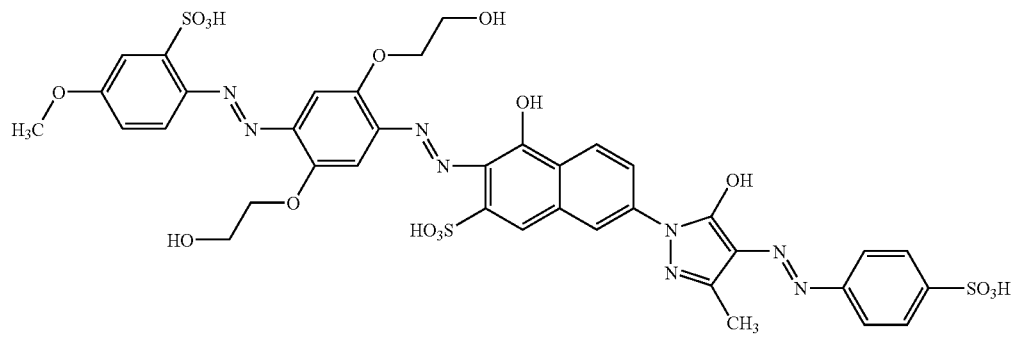

Stage 1—Preparation of:

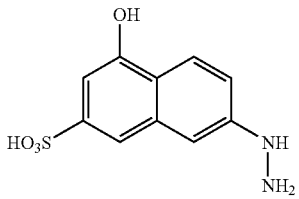

6-Amino-1-naphthol-3-sulphonic acid (J-Acid) (53 g) was dissolved in water (400 ml) with the addition of caustic liquor until alkaline to brilliant yellow indicator paper. Sodium nitrite (13.8 g) was then added and the solution then charged to a stirred mixture of ice and hydrochloric acid (30 ml). After stirring at 0-5° C. for 1 hr the excess nitrous acid was destroyed by the addition of sulphamic acid. The precipitated diazonium salt was isolated by filtration and the damp paste added to a stirred, cooled (<10° C.) mixture of tin(II)chloride (100 g) and hydrochloric acid. On completion of the addition the slurry was stirred at room temperature for overnight. The product was isolated by filtration and purified by washing with ethanol (400 ml) before being re-isolated by filtration and air dried. Yield was 53.5 g of a beige solid.

Stage 2—Preparation of:

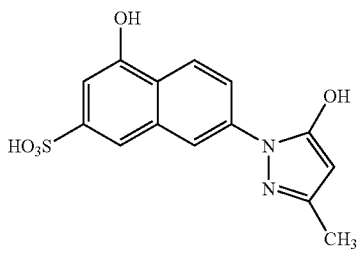

The product from Stage 1 (30 g) was stirred in water (300 ml) and the pH adjusted to 8 by addition of dilute sodium hydroxide solution. Ethyl acetoacetate (15 g) was added and the stirred mixture heated at 45-50° C. for 6 hrs. After cooling to room temperature the pH was adjusted to 3 and the precipitated product isolated by filtration. Yield was 26 g of an orange solid.

Stage 3—Preparation of:

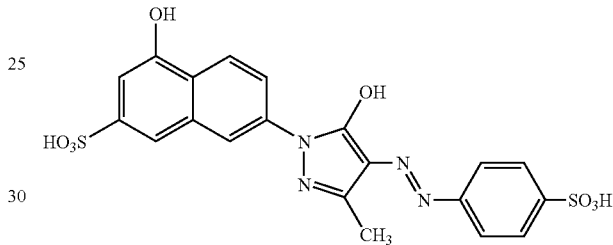

Sulphanilic acid (10 g) was dissolved in water (100 ml) and the pH adjusted to give an alkaline reaction to brilliant yellow indicator paper using dilute lithium hydroxide. Sodium nitrite (4.5 g) was then added and the mixture added to a stirred mixture of hydrochloric acid (20 ml) and ice at a temperature of 0-5° C. After stirring for a further 30 mins the excess nitrous acid was destroyed by the addition of sulphamic acid. This diazonium salt solution was then added to a solution of the product from Stage 2 (25 g) and sodium acetate (20 g) in water. After stirring for 30 mins at 0-5° C. the mixture was allowed to warm to room temperature and stirred overnight. The product was precipitated by addition of sodium chloride (to 15% w/v) and isolated by filtration and dried in an oven at 60° C. Yield was 49 g of an orange solid.

Stage 4—Preparation of:

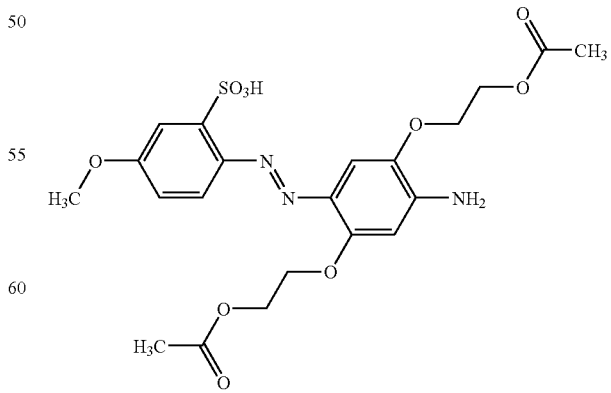

This intermediate was prepared by the method as described in example 3 of WO 03/095563.

Stage 5—Preparation of:

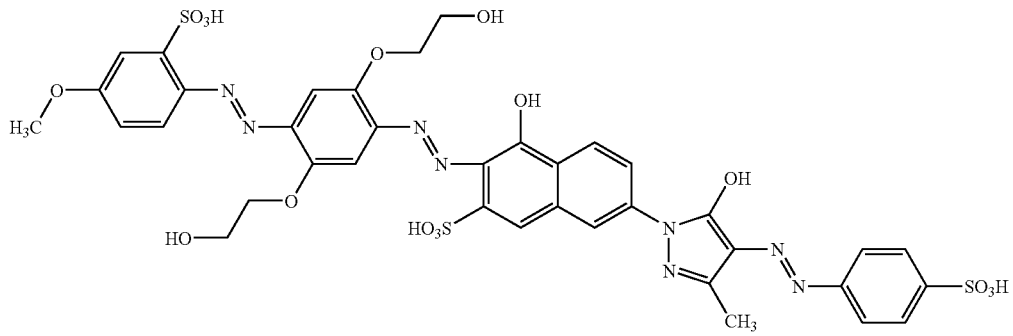

The product from Stage 4 (13.4 g) was stirred in N-methylpyrrolidone (NMP, 100 ml) and sodium nitrite (2.6 g) added followed by a solution of hydrochloric acid (10 ml) in water (70 ml). An exothermic reaction occurred raising the temperature to ~40° C. resulting in an initially homogeneous solution that after several minutes precipitated the diazonium salt. The suspension was stirred for 2 hrs before cooling to 0-5° C. and destroying excess nitrous acid by addition of sulphamic acid.

The product from Stage 3 (24.3 g) was dissolved in water (200 ml) and the pH adjusted to 8.5 by addition of dilute lithium hydroxide solution, cooled to 0-5° C. and the above prepared diazonium salt suspension slowly added maintaining the pH at 8.5. After 2 hrs the reaction was allowed to warm to room temperature and then stirred overnight. Lithium hydroxide (10 g) was added and stirring continued for a further 2 hrs. TLC showed complete hydrolysis. The pH was then adjusted to 7.5 and the reaction mixture drowned into acetone (2500 ml). The product was isolated by filtration and purified by slurrying in NMP (300 ml) for 30 mins and again drowning into acetone (2000 ml) before re-isolating by filtration. The product was dissolved in deionized water and dialysed to low conductivity before evaporation to dryness at 60° C. Yield was 15.4 g, $\lambda_{max}$=578 nm.

EXAMPLE 2

Preparation of a Dye Compound of structure:

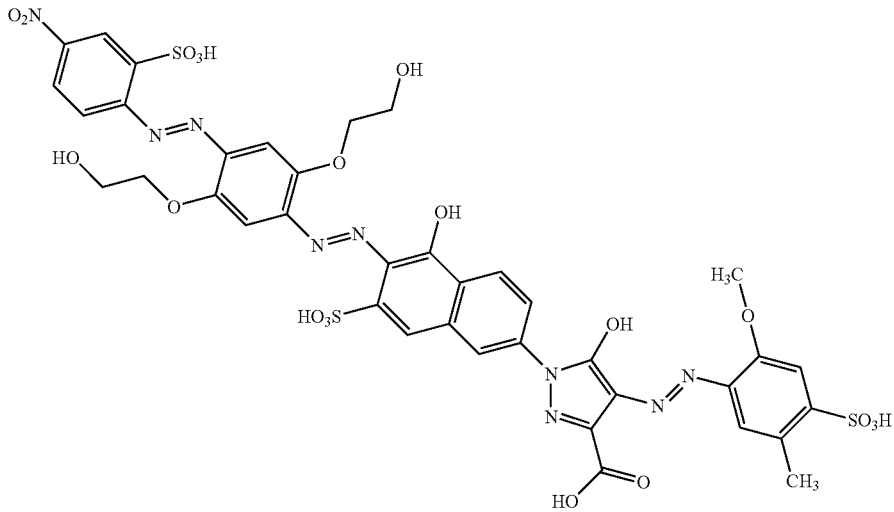

Stage 1—Preparation of:

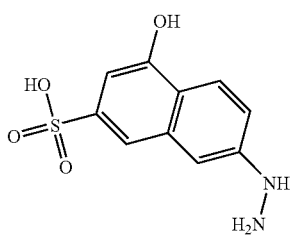

6-Amino-1-naphthol-3-sulphonic acid (J-Acid) (53 g) was dissolved in water (400 ml) with the addition of caustic liquor until alkaline to brilliant yellow indicator paper. Sodium nitrite (13.8 g) was then added and the solution then charged to a stirred mixture of ice and hydrochloric acid (30 ml). After stirring at 0-5° C. for 1 hr the excess nitrous acid was destroyed by the addition of sulphamic acid. The precipitated diazonium salt was isolated by filtration and the damp paste added to a stirred, cooled (<10° C.) mixture of tin(II)chloride (100 g) and hydrochloric acid (100 ml). On completion of the addition the slurry was stirred at room temperature for overnight. The product was isolated by filtration and purified by washing with ethanol (400 ml) before being re-isolated by filtration and air dried. Yield was 53.5 g of a beige solid.

Stage 2—Preparation of:

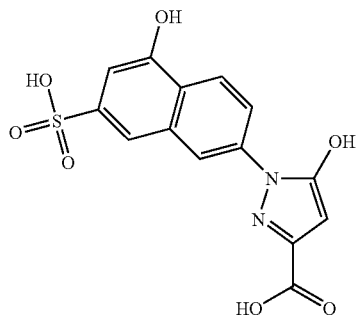

The product from Stage 1 (100 g) was stirred in water (200 ml) and the pH adjusted to 3.5 by addition of dilute sodium hydroxide solution. Diethyl oxalacetate sodium salt (76 g) was added over 30 mins, during which time the pH raised to 5.5, and the stirred mixture heated at 50-60° C. for 30 mins. Carbon DY3 (2 g) and sodium hydroxide (41 g) were added (Caution: Exothermic) and the reaction mixture stirred at 90° C. for 1 hour. After cooling to 40° C. the pH was adjusted to 1.5 and the precipitated product isolated by filtration. Yield was 114 g of a beige solid.

Stage 3—Preparation of:

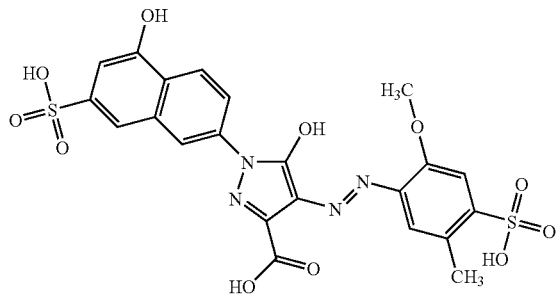

4-Sulfocresidine (21.6 g) was dissolved in water (200 ml) and the pH adjusted to give an alkaline reaction to brilliant yellow indicator paper using dilute sodium hydroxide. Sodium nitrite (7.6 g) was then added and the mixture added to a stirred mixture of hydrochloric acid (15 ml) and ice at a temperature of 0-5° C. After stirring for a further 30 min the excess nitrous acid was destroyed by the addition of sulphamic acid. This diazonium salt solution was then added to a solution of the product from Stage 2 (35 g) and sodium acetate (20) in water. After stirring for 30 mins at 0-5° C. the mixture was allowed to warm to room temperature and stirred overnight. The product was precipitated by addition of sodium chloride (to 15% w/v) and isolated by filtration and then dialysed using Visking tubing after redissolving in water. The desalinated solution was concentrated in an oven at 60° C. Yield was 12 g of an orange solid.

Stage 4—Preparation of:

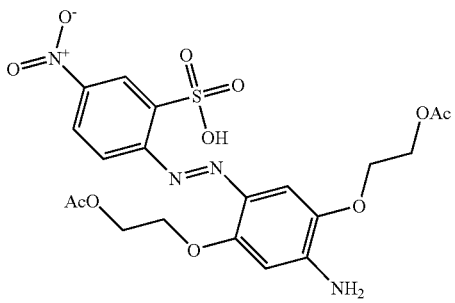

This intermediate was prepared as described in WO2003/106572 example 1, stage (B) with the exception that 5-nitro-2-aminobenzenesulfonic acid was used in place of 5-acetylamino-2-aminobenzenesulfonic acid.

Stage 5—Preparation of:

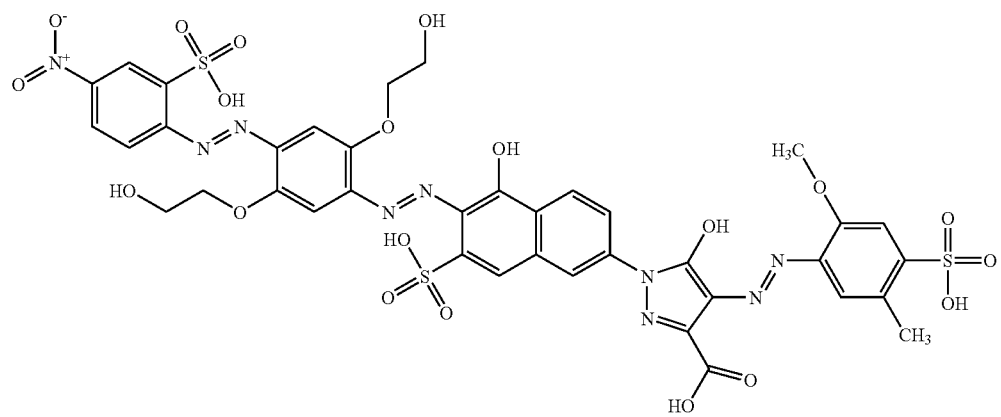

The product from Stage 4 (3.9 g) was stirred in N-methylpyrrolidone (NMP, 50 ml) and sodium nitrite (0.73 g) added followed by a solution of hydrochloric acid (5 ml) in water (20 ml). An exothermic reaction occurred raising the temperature to ~40° C. resulting in an initially homogeneous solution that after several minutes precipitated the diazonium salt. The suspension was stirred for 2 hrs before cooling to 0-5° C. and destroying excess nitrous acid by addition of sulphamic acid.

The product from Stage 3 (7 g) was dissolved in water (200 ml) and the pH adjusted to 8.5 by addition of dilute lithium hydroxide solution, cooled to 0-5° C. and the above prepared diazonium salt suspension slowly added maintaining the pH at 8.5. After 2 hrs the reaction was allowed to warm to room temperature and then stirred overnight. Lithium hydroxide (10 g) was added and stirring continued for a further 2 hrs. TLC indicated complete hydrolysis of the ester functional groups. The pH was then adjusted to 8 and the reaction mixture drowned into acetone (1500 ml). The product was isolated by filtration and then redissolved in deionized water and dialysed to low conductivity before evaporation to dryness at 60° C. Yield was 4.5 g, $\lambda_{max}$=619 nm

EXAMPLES 3 TO 45

The same methodology as Example 1 was repeated to give the Dye compounds shown in Table 1.

TABLE 1

| Example | Dye structure | $\lambda_{max}$/nm |
|---|---|---|
| 3 | 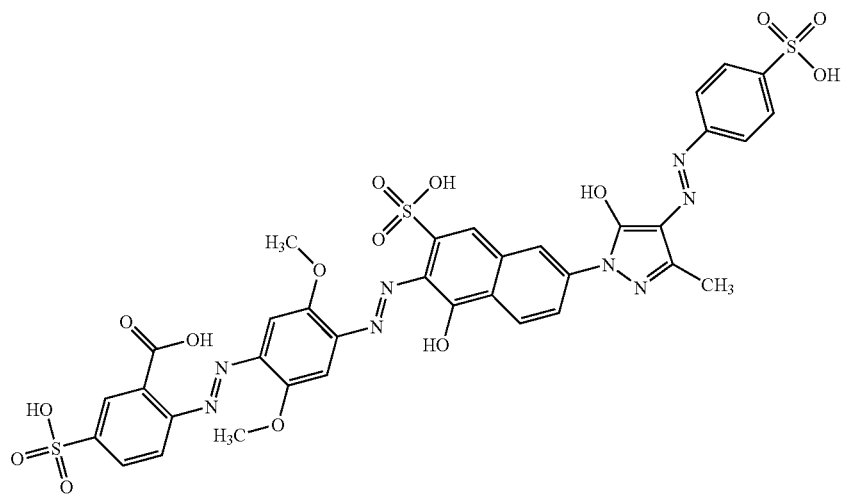 | 581 |
| 4 | 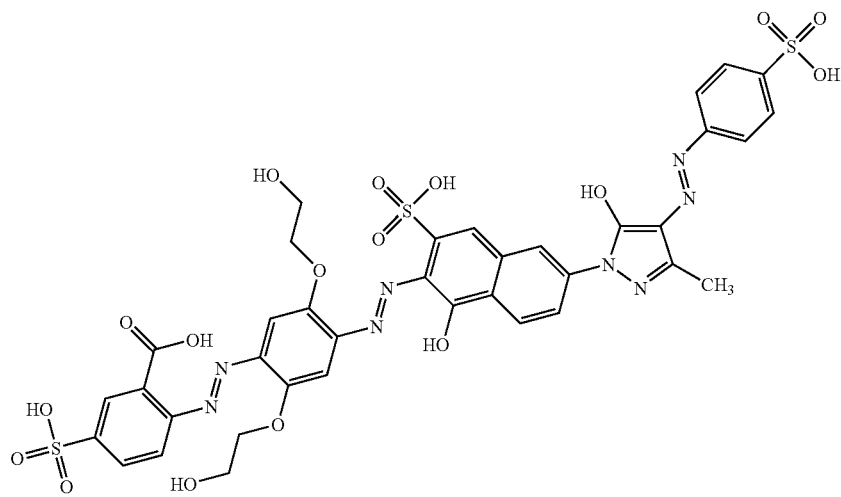 | 567 |

TABLE 1-continued

| Example | Dye structure | $\lambda_{max}$/nm |
|---|---|---|
| 5 | | 575 |
| 6 | | 566 |
| 7 | | 587 |

TABLE 1-continued

| Example | Dye structure | $\lambda_{max}$/nm |
|---|---|---|
| 8 | (structure) | 574 |
| 9 | (structure) | 553 |
| 10 | (structure) | 582 |

TABLE 1-continued
| Example | Dye structure | $\lambda_{max}$/nm |
|---|---|---|
| 11 | 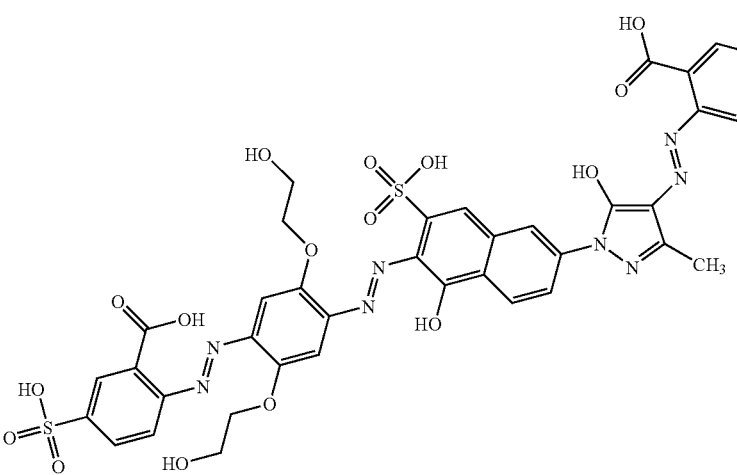 | 569 |
| 12 | 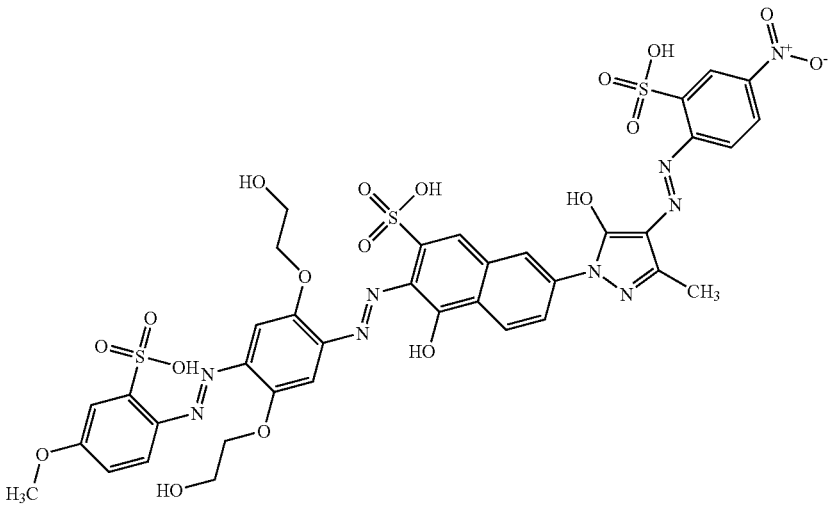 | 580 |
| 13 | 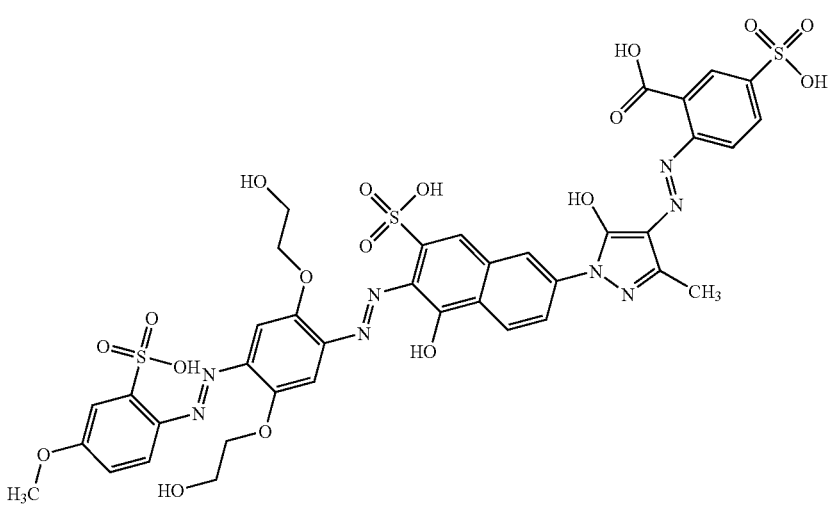 | 572 |

TABLE 1-continued
| Example | Dye structure | $\lambda_{max}$/nm |
|---|---|---|
| 14 | 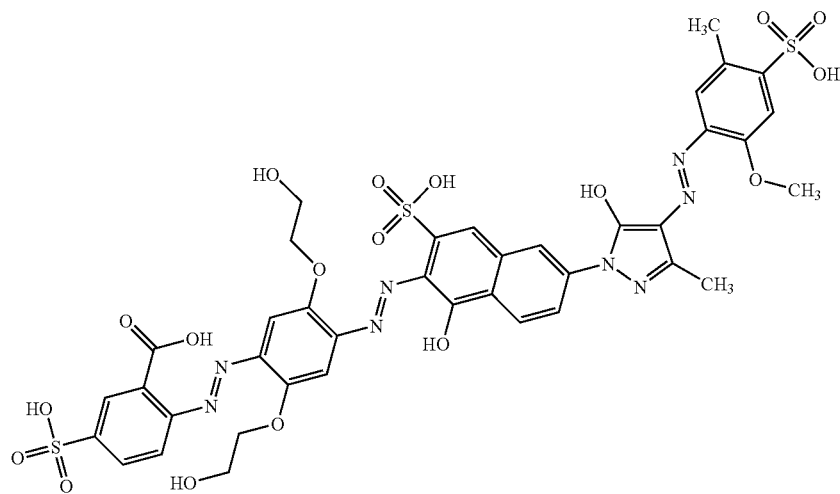 | 577 |
| 15 | 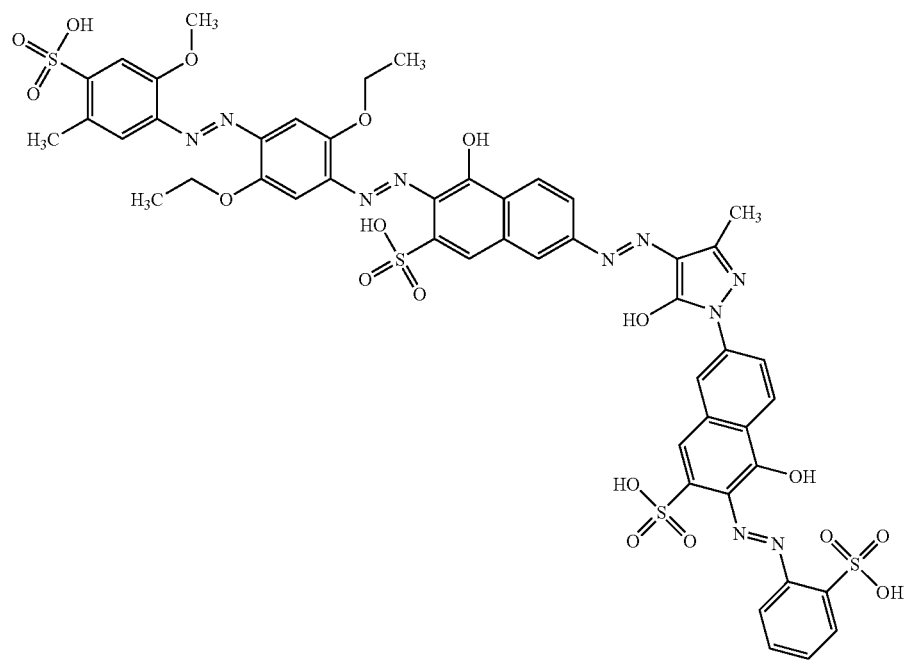 | 600 |

TABLE 1-continued
| Example | Dye structure | $\lambda_{max}$/nm |
|---|---|---|
| 16 | 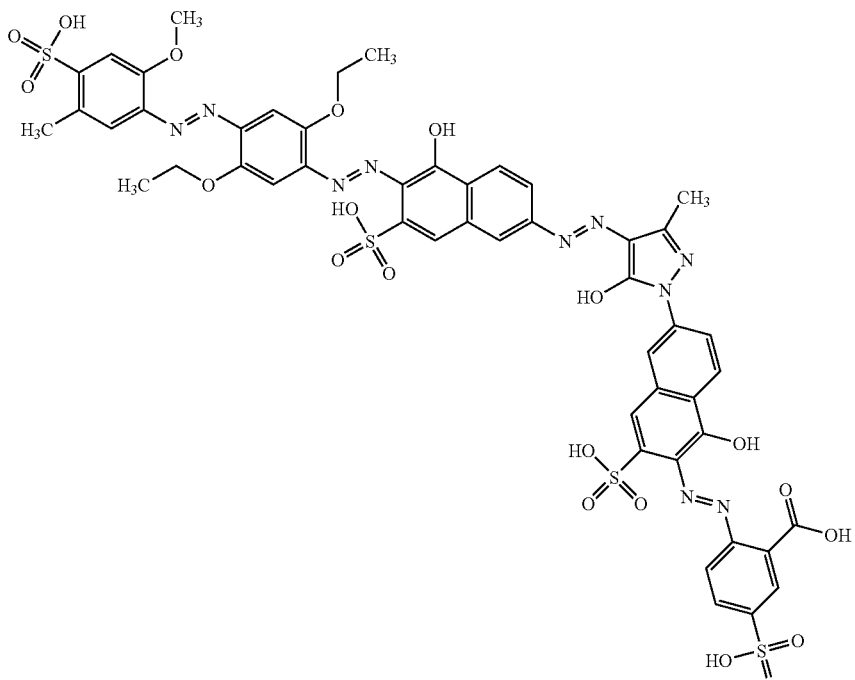 | 600 |
| 17 | 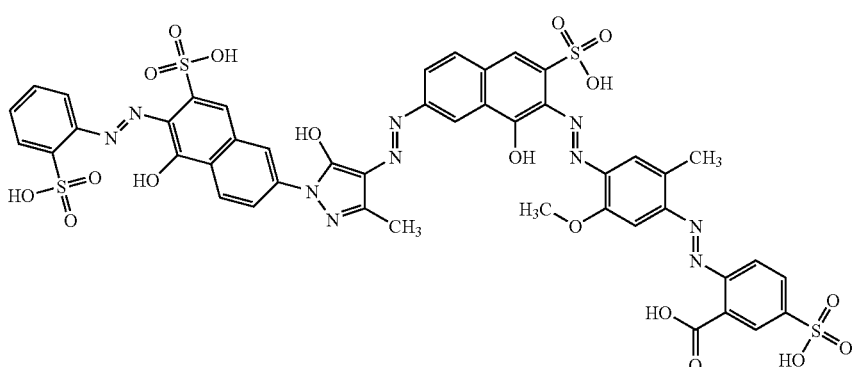 | 589 |
| 18 | 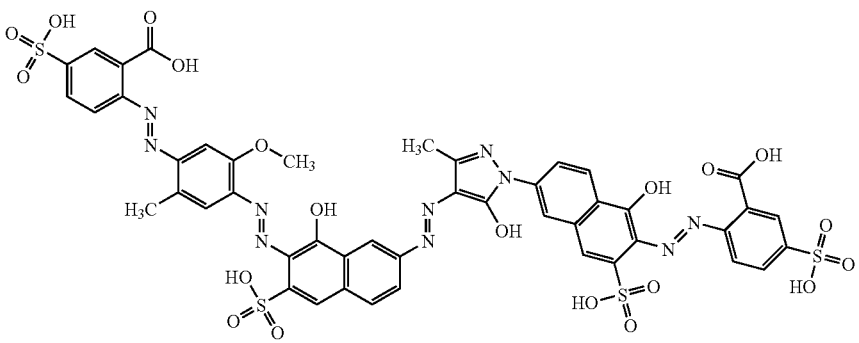 | 575 |

TABLE 1-continued

| Example | Dye structure | $\lambda_{max}$/nm |
|---|---|---|
| 19 | | 598 |
| 20 | | 588 |

TABLE 1-continued

| Example | Dye structure | $\lambda_{max}$/nm |
| --- | --- | --- |
| 21 | | 575 |
| 22 | | 572 |

TABLE 1-continued
| Example | Dye structure | $\lambda_{max}$/nm |
|---|---|---|
| 23 | 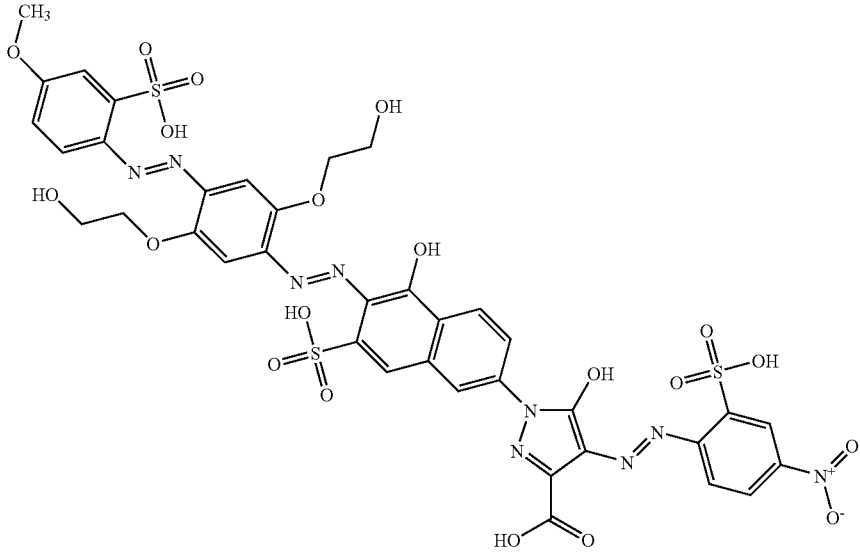 | 587 |
| 24 | 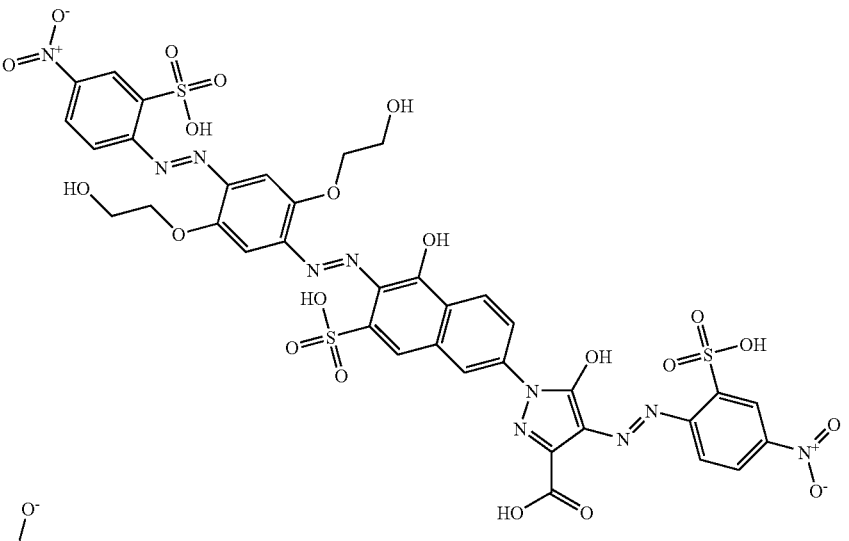 | 596 |
| 25 | 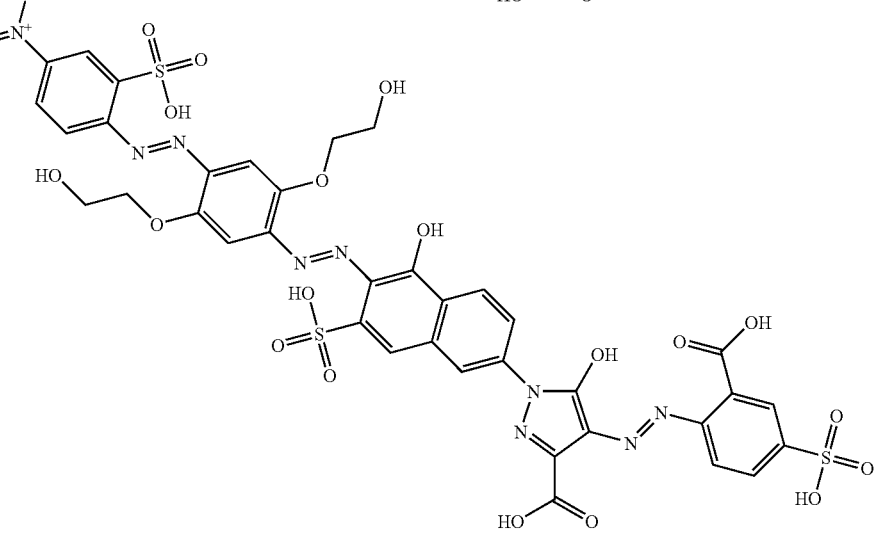 | 583 |

TABLE 1-continued

| Example | Dye structure | $\lambda_{max}$/nm |
|---|---|---|
| 26 | | 596 |
| 27 | | 574 |
| 28 | | 583 |

TABLE 1-continued

| Example | Dye structure | $\lambda_{max}$/nm |
|---|---|---|
| 29 | | 588 |
| 30 | | 585 |
| 31 | | 536 |

TABLE 1-continued

| Example | Dye structure | $\lambda_{max}$/nm |
|---|---|---|
| 32 | | 580 |
| 33 | | 578 |
| 34 | | 568 |

TABLE 1-continued

| Example | Dye structure | $\lambda_{max}$/nm |
|---|---|---|
| 35 | | 595 |
| 36 | | 612 |
| 37 | | 593 |

TABLE 1-continued
| Example | Dye structure | $\lambda_{max}$/nm |
|---|---|---|
| 38 | 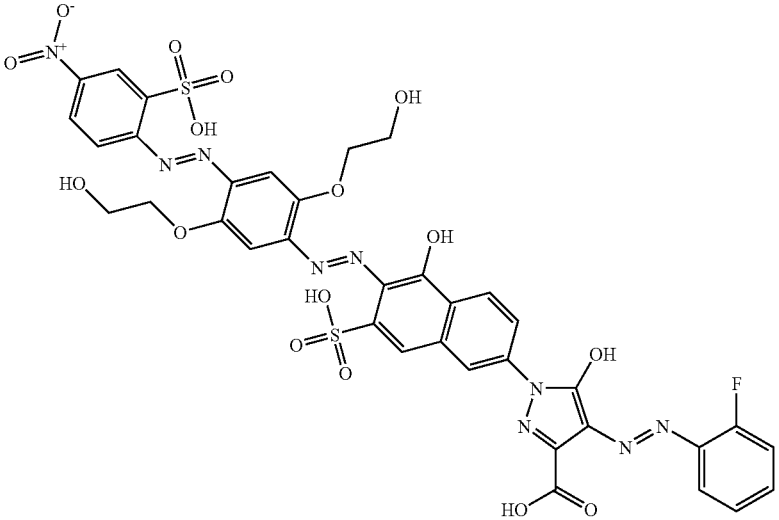 | 612 |
| 39 | 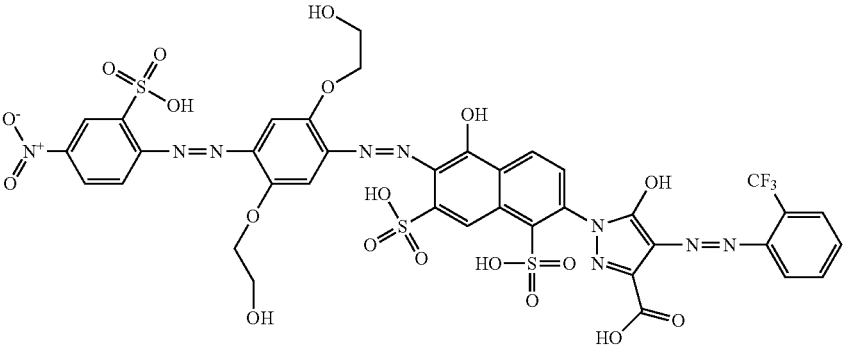 | 583 |
| 40 | 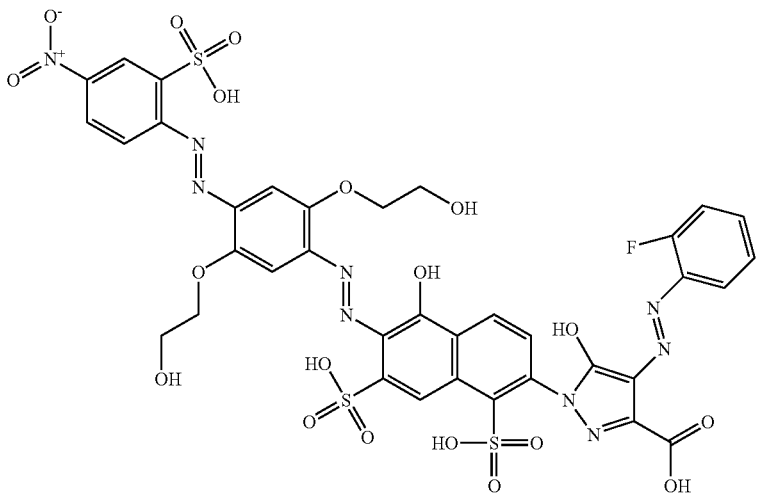 | 579 |

TABLE 1-continued

| Example | Dye structure | $\lambda_{max}$/nm |
|---|---|---|
| 41 | | 573 |
| 42 | | 598 |
| 43 | | 575 |

TABLE 1-continued

| Example | Dye structure | $\lambda_{max}$/nm |
|---|---|---|
| 44 | 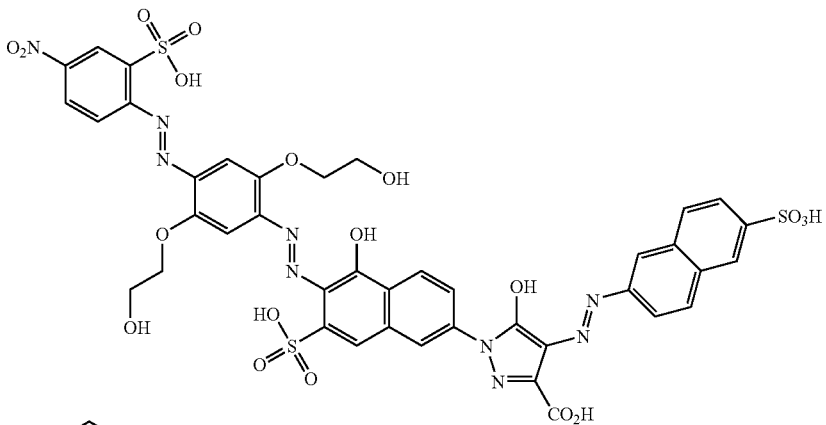 | 616 |
| 45 | 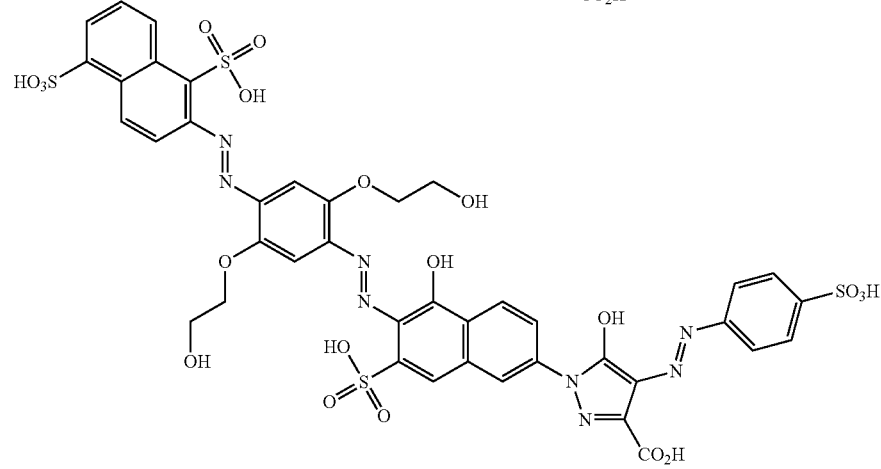 | 555 |

EXAMPLE 46

Ink Formulations

Inks may be prepared according to the following formulation wherein Dye is a Dye, or mixture of two or more Dyes, from the above Examples:

| | |
|---|---|
| 2-Pyrrolidone | 5 parts |
| Thiodiglycol | 5 parts |
| Surfynol ™ 465 | 1 part (from Air Products Inc., USA) |
| Dye | 3 parts |
| Water | 86 parts |

Further inks described in Tables 2 and 3 may be prepared wherein the Dye described in the first column is the compound or mixture made in the above Example of the same number. Numbers quoted in the second column onwards refer to the number of parts of the relevant ingredient and all parts are by weight. The inks may be applied to paper by, for example, thermal or piezo ink jet printing.

The following abbreviations are used in Table 2 and 3:
PG=propylene glycol
DEG=diethylene glycol
NMP=N-methyl pyrollidone
DMK=dimethylketone
IPA=isopropanol
MeOH=methanol
2P=2-pyrollidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=thiodiglycol

TABLE 2

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | 5 | 1 | | |
| 4 | 2.1 | 91 | | 8 | | | | | | | | 1 |

TABLE 2-continued

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | | 6 | 2 | 5 | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | | 7 | 0.3 | | 3 | | | |
| 19 | 5.4 | 69 | 2 | 20 | 2 | 1 | | | | | 3 | 3 |
| 20 | 6.0 | 91 | | | 4 | | | | | | 5 | |

TABLE 3

| Dye | Dye Content | Water | PG | DEG | NMP | CET | TBT | TDG | BDL | PHO | 2P | PI2 |
|---|---|---|---|---|---|---|---|---|---|---|---|---|
| 21 | 3.0 | 80 | 15 | | | 0.2 | | | | | 5 | |
| 22 | 9.0 | 90 | | 5 | | | | | | 1.2 | | 5 |
| 23 | 1.5 | 85 | 5 | 5 | | 0.15 | 5.0 | 0.2 | | | | |
| 24 | 2.5 | 90 | | 6 | 4 | | | | | 0.12 | | |
| 25 | 3.1 | 82 | 4 | 8 | | 0.3 | | | | | | 6 |
| 26 | 0.9 | 85 | | 10 | | | | | 5 | 0.2 | | |
| 27 | 8.0 | 90 | | 5 | 5 | | | 0.3 | | | | |
| 28 | 4.0 | 70 | | 10 | 4 | | | | 1 | | 4 | 11 |
| 29 | 2.2 | 75 | 4 | 10 | 3 | | | 2 | | | 6 | |
| 30 | 10.0 | 91 | | | 6 | | | | | | 3 | |
| 31 | 9.0 | 76 | | 9 | 7 | | 3.0 | | | 0.95 | 5 | |
| 32 | 5.0 | 78 | 5 | 11 | | | | | | | 6 | |
| 33 | 5.4 | 86 | | | 7 | | | | | | 7 | |
| 34 | 2.1 | 70 | 5 | 5 | 5 | 0.1 | 0.2 | 0.1 | 5 | 0.1 | 5 | |
| 35 | 2.0 | 90 | | 10 | | | | | | | | |
| 36 | 2 | 88 | | | | | | | 10 | | | |
| 37 | 5 | 78 | | | 5 | | | 12 | | | 5 | |
| 38 | 8 | 70 | 2 | | 8 | | | | 15 | | 5 | |
| 39 | 10 | 80 | | | | | | 8 | | | 12 | |
| 40 | 10 | 80 | | | 10 | | | | | | | |

Print Testing and Evaluation

Preparation of Inks 1-4

Ink 1 for testing and evaluation was prepared by dissolving 3 g of the dye from Example 2 above in 97 ml of a liquid medium consisting of 5 parts 2-pyrrolidone; 5 parts thiodiethylene glycol; 1 part Surfynol™ 465 and 89 parts water and adjusting the pH to between pH 8 to 9 with sodium hydroxide. Ink 1 had a viscosity of less than 20 cP 25° C.; a surface tension in the range 20-65 dynes/cm at 25° C.; less than 500 ppm in total of divalent and trivalent metal ions (other than any divalent and trivalent metal ions bound to a compound of Formula (1) or any other component of the ink); and less than 500 ppm in total of halide ions.

Inks 2-4 were prepared in the same manner as Ink 1 but using the dyes shown in Table 4 in place of the dye from Example 2.

Preparation of Comparative Ink C1

Comparative Ink C1 was prepared in the same manner as Ink 1, except that in place of the dye from Example 2 there was used a comparative dye D1 which was prepared according to the method of Example 2 of WO 03/106572.

TABLE 4

| Ink | Dye of Example no. |
|---|---|
| Ink 1 | 2 |
| Ink 2 | 27 |
| Ink 3 | 44 |
| Ink 4 | 45 |
| Comparative Ink C1 | Comparative Dye D1 |

Ink-Jet Printing and Evaluation

Inks 1-4 and Comparative Ink C1 prepared as described above were filtered through a 0.45 micron nylon filter and then incorporated into empty print cartridges using a syringe. These inks were then printed on to Canon Premium PR101 Photo Paper (PR101) and HP Premium Plus Photo Paper (HPPP).

Optical density measurements were performed on squares printed at 70% print density, using a Gretag spectrolino spectrophotometer set to the following parameters:

| | |
|---|---|
| Measuring Geometry | 45°/0° |
| Spectral Range | 380-730 nm |
| Spectral Interval | 10 nm |
| Illuminant | D65 |
| Observer | 2° (CIE 1931) |
| Density | Ansi A |
| External Filler | None |

The prints exhibited good optical density. Light fastness of the printed image was assessed by fading the printed image in an Atlas Ci5000 Weatherometer for 100 hours and then measuring the change in the optical density. Results of the light fastness test are shown in Table 5, where a lower figure indicates higher light fastness.

TABLE 5

| Print Example | Ink | Light fastness (PR101) | Light fastness (HPPP) |
|---|---|---|---|
| 1 | Ink 1 | 41 | 24 |
| 2 | Ink 2 | 42 | 37 |
| 3 | Ink 3 | 40 | 32 |
| 4 | Ink 4 | 25 | 29 |
| Comparative | Ink C1 | 74 | 63 |

The results shown in Table 5 demonstrate that prints made using Inks 1-4 according to the present invention have higher light fastness than the print made using the Comparative Ink C1.

The invention claimed is:

1. A process for printing an image on a substrate, the process comprising applying to the substrate by an ink jet printing process an ink composition which comprises a liquid medium and a compound of Formula (1):

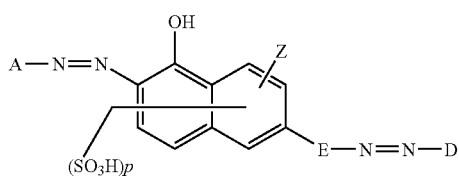

Formula (1)

wherein:
A and D each independently represent optionally substituted aryl or optionally substituted heteroaryl;
E represents optionally substituted pyrazolyl;
Z represents H, halogen, nitro, cyano, hydroxy, amino, carboxy, optionally substituted alkyl, optionally substituted alkoxy or optionally substituted aryloxy; and
p is an integer from 0 to 5;
provided that E does not have an optionally substituted carbonamide group of formula —$CONR^1R^2$ directly attached to it, wherein $R^1$ and $R^2$ each independently represent H, optionally substituted alkyl, optionally substituted cycloalkyl, or optionally substituted aryl.

2. A process as claimed in claim 1 wherein E is a pyrazolyl group selected from the group consisting of Formula (2a) or (2b) and tautomers thereof:

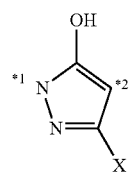

Formula (2a)

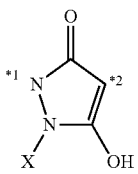

Formula (2b)

wherein:
$*^1$ represents the point of attachment to the naphthyl group and
$*^2$ represents the point of attachment to the azo linkage; and
X represents H, optionally substituted alkyl, optionally substituted cycloalkyl, optionally substituted alkoxy, optionally substituted aryl, optionally substituted heteroaryl, optionally substituted aryloxy, optionally substituted amino, halogen, cyano, hydroxyl, thio, nitro, sulpho, phosphato, optionally substituted ureido, $COOR^1$, $OCOOR^1$, $OCOR^1$, $COR^1$, $SR^1$, $SO_2NR^1R^2$, or $SO_2R^1$.

3. A process as claimed in claim 1 wherein A is at least substituted by two groups selected from the group consisting of $C_{1-4}$ alkoxy and —O—$(CH_2)_{1-4}$—OH.

4. A process as claimed in claim 1 wherein A is at least substituted by at least one optionally substituted carbocyclic azo or optionally substituted heterocyclic azo group.

5. A process as claimed in claim 1 wherein the compound of Formula (1) is in the form of a salt.

6. A process as claimed in claim 1 wherein for the compound of Formula (1):
p is 1 or 2;
Z is H;
A is optionally substituted phenyl (i) carrying two groups selected from the group consisting of $C_{1-4}$ alkoxy and —O—$(CH_2)_{1-4}$—OH and (ii) carrying an optionally substituted phenyl azo group carrying at least one sulpho, carboxy and/or phosphato group; and
E is of Formula (2a):

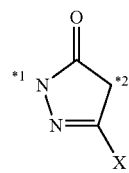

Formula (2a)

wherein
$*^1$ represents the point of attachment to the naphthyl group,
$*^2$ represents the point of attachment to the azo linkage and
X is selected from optionally substituted $C_{1-4}$ alkyl or carboxy; and
D is optionally substituted phenyl carrying at least one sulpho, carboxy and/or phosphato group.

7. A process as claimed in claim 6 wherein the compound is in the form of a salt.

8. An ink composition suitable for use in an ink-jet printer comprising:

(a) from 0.01 to 30 parts of a compound of the Formula (1) as defined in claim 1; and
(b) from 70 to 99.99 parts of a liquid medium or a low melting point solid medium;

wherein all parts are by weight and the number of parts of (a)+(b)=100, and wherein the ink has been filtered through a filter having a mean pore size below 10 μm.

9. A substrate on which an image has been printed by the process as claimed in claim 1.

10. An ink jet printer cartridge, optionally refillable, comprising one or more chambers and an ink composition, wherein the ink composition is present in at least one of the chambers and the ink composition is an ink composition as claimed in claim 8.

11. An ink set comprising at least a black ink, a magenta ink, a cyan ink and a yellow ink and wherein the black ink comprises a compound of Formula (1) as defined in claim 1.

* * * * *